United States Patent [19]

Rikker et al.

[11] 3,866,799
[45] Feb. 18, 1975

[54] MIXER WITH AUTOMATICALLY CONTROLLED DISCHARGE SYSTEM

[75] Inventors: Leslie D. Rikker, Oak Forest; Gerhard A. Suckfuell, Mount Prospect, both of Ill.

[73] Assignee: National Engineering Company, Chicago, Ill.

[22] Filed: June 18, 1973

[21] Appl. No.: 370,794

[52] U.S. Cl. ............ 222/63, 222/504, 73/59, 259/DIG. 4, 259/41
[51] Int. Cl. ............................. B67d 5/08
[58] Field of Search ........ 222/52, 55, 56, 63, 504; 73/59; 259/DIG. 4, 41, 42, 43, 44, 45, 46, 47, 36, 37, 38, 39, 40, 170; 60/547, 571, 593

[56] References Cited
UNITED STATES PATENTS

| | | | |
|---|---|---|---|
| 1,449,458 | 3/1923 | Sutermeister | 73/59 X |
| 2,111,663 | 3/1938 | Graemiger | 222/56 |
| 2,668,693 | 2/1954 | Gard | 222/52 X |
| 2,943,801 | 7/1960 | McIlvaine et al. | 259/DIG. 4 |
| 3,185,098 | 5/1965 | Lundh | 222/334 X |
| 3,395,834 | 8/1968 | Troy | 222/63 |
| 3,398,861 | 8/1968 | Ulrich | 222/178 X |
| 3,423,938 | 1/1969 | Cavalieri | 60/593 X |
| 3,677,540 | 7/1972 | Weiss | 222/63 X |
| 3,702,535 | 11/1972 | House | 60/571 X |

*Primary Examiner*—Robert B. Reeves
*Assistant Examiner*—Joseph J. Rolla
*Attorney, Agent, or Firm*—Mason, Kolehmainen, Rathburn & Wyss

[57] ABSTRACT

A system for conditioning bulk material comprising a mixer having a mixing chamber and motor means driving a rotary mixing element in the chamber; an automatically controlled discharge system for discharging material from the chamber at a selected constant rate, the discharge system comprising an outlet opening formed in the mixing chamber, a discharge door adjacent the opening mounted for reciprocal vertical movement between a closed position covering the opening and an open position uncovering the opening, and a fluid motor for normally maintaining the door in a fixed neutral position partially uncovering the opening and operable to move the door out of the neutral position when a selected variation in load on the motor means is exceeded and to return the door toward said neutral position when the variation is no longer exceeded.

5 Claims, 3 Drawing Figures

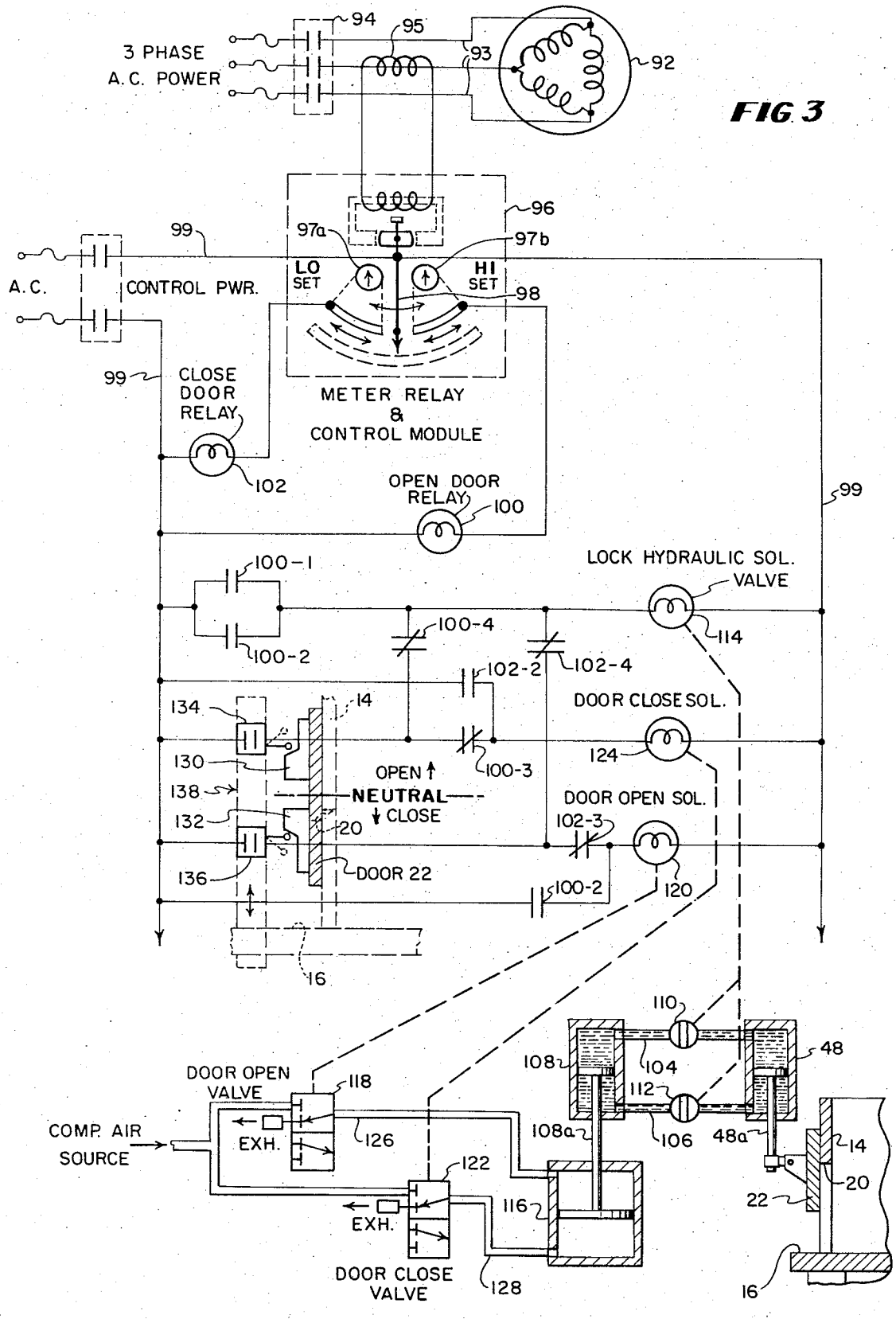

MIXER WITH AUTOMATICALLY CONTROLLED DISCHARGE SYSTEM

The present invention relates to a new and improved system for conditioning bulk materials such as ores, foundry sand, various particulates and the like and is an improvement on the mixer with automatically controlled discharge system shown and described in U.S. Pat. No. 3,395,834 dated Aug. 6, 1968 and the controlled rate discharge device shown and described in U.S. Pat. No. 3,231,146, dated Jan. 25, 1966.

Mixing machines utilized in a continuous flow process, as distinguished from a batch process, must provide means for discharging finished material at an adjustably selected, relatively constant rate and must be able to automatically compensate for input flow variations to the mixer. For example, during the initial startup of a process, the flow rate of material input into a mixing machine may be small and then may be increased to a selected normal value. During the startup interval, the mixer should hold and accumulate material until enough is on hand in the mixer to provide an output flow at a selected discharge rate which is relatively constant. The mixer should also be capable of automatically correcting for input variations and continuously provide a relatively constant rate of discharge of finished material until the process is shut down or stopped.

It is an object of the present invention to provide a new and improved system for conditioning bulk material which accomplishes the foregoing desirable characteristics.

More specifically, it is an object of the present invention to provide a new and improved mixer having an automatically controlled discharge system which is capable of maintaining a relatively constant flow rate output of finished material even though the input flow rate may vary.

Yet another object of the present invention is the provision of a new and improved mixer having a vertically movable discharge door modulated by an automatically controlled system and operable to maintain an adjustably selected relatively constant output flow of finished material.

Still another object is the provision of a new and improved mixer having a discharge door or gate normally maintained in a fixed neutral position but movable toward a more closed position and in an opposite direction toward a more open position when a load variation above a certain selected value is exceeded.

Yet another object of the invention is the provision of a new and improved mixer as described in the foregoing object wherein the discharge gate or door is automatically returned to and maintained in an adjustably selected neutral position when the variations of mixer load drops below a selected value.

Still another object of the invention is the provision of a new and improved mixer having an automatically controlled discharge device which is adjustably controlled in response to a selectively adjustable variation in power required for rotating the mixing element through the material in the mixing chamber.

Another object of the invention is to provide a new and improved mixer having a chamber for containing a quantity of the material being treated and a discharge opening in said chamber having a vertically movable door or gate associated therewith to control the discharge of material from said chamber.

Yet another object of the invention is to provide a new and improved control system for providing a substantially constant, adjustably selected rate of discharge from a mixing chamber or the like.

The foregoing and other objects and advantages of the present invention are accomplished by the provision of a new and improved system for processing bulk materials and the like including a mixer having a motor driven rotary mixing element mounted in a mixing chamber for mixing the material therein. The mixing chamber is formed with a discharge opening and a discharge door or gate is mounted for vertical movement with respect to the opening to control the discharge flow of material from the chamber. The gate or door is normally maintained in an adjustably selected neutral position and is modulated toward a more closed position or toward a more open position whenever the load or motor power supplied to the mixing element exceeds an adjustably selected variation. When the load returns within the normal variation the door is automatically returned to and maintained in the neutral position.

For a better understanding of the invention, reference should be had to the following detailed description taken in conjunction with the drawings in which:

FIG. 3 is a schematic diagram of an electropneumatic-hydraulic control system.

Figure 1:
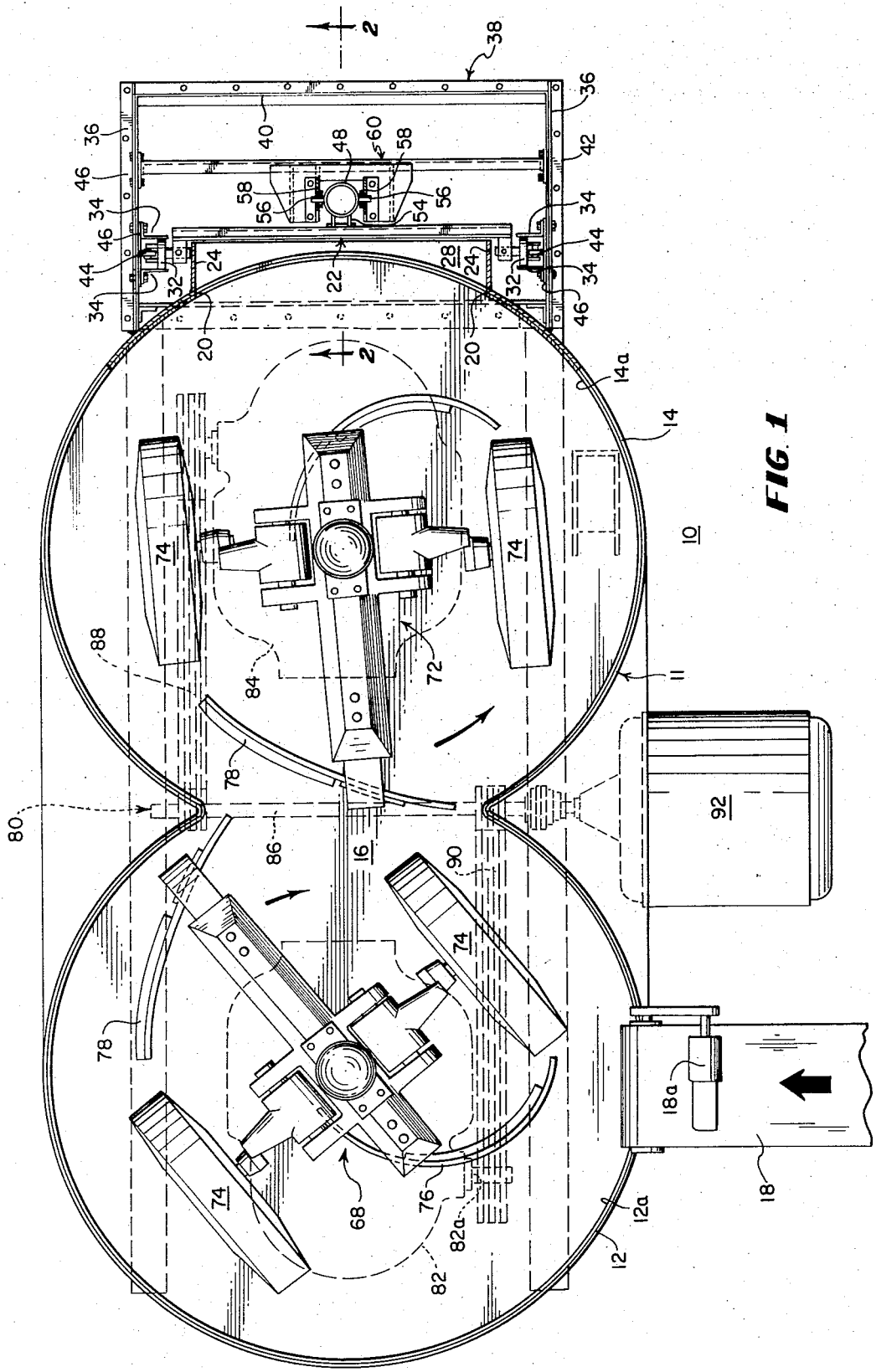
FIG. 1 is a top plan view of a new and improved mixer having an automatically controlled discharge system constructed in accordance with the features of the present invention.

Referring now more specifically to the drawings, in FIG. 1 is illustrated a continuous mixing and mulling machine constructed in accordance with the present invention and indicated generally by the reference numeral 10. The mixer 10 includes a mixing chamber 11 having a pair of interconnected generally cylindrical mixing chamber sections 12 and 14 having a common floor or bottom wall 16 shaped like a figure 8 and upstanding vertical sidewalls 12a and 14a which are joined together at a pinched or narrowed central portion of the mixer, permitting the material being treated to move between the two chambers. Material to be conditioned is delivered to the chamber 12, which constitutes an input stage. Input of material at a selectively controlled rate is provided by a suitable feeding mechanism, such as a motor driven belt conveyor 18 or equivalent and this material is mixed and conditioned in the chamber section 12 before passing into the second or output chamber section 14 for a final stage of conditioning before discharge. The sidewall 14a of the output chamber section 14 is formed with a discharge opening 20 to permit the outflow or discharge of the finished material.

In order to control the discharge of material flowing out of the mixing chamber 11 through the outlet opening 20, a discharge door or gate 22 is mounted for vertical sliding movement between a closed position (FIG. 2) at its lower limit and an open position at its upper limit. The gate 22 slides up and down along the outer vertical edges of a pair of discharge chute sidewalls 24 projecting outwardly from the opposite side edges of the opening 20 in the sidewall 14a and the discharge chute includes a floor 28 and top wall 30 (FIG. 2) to form a rectangular discharge opening which is flow controlled by the gate 22. The gate is supported for vertical movement by pairs of guide rolls 32 carried adjacent the upper and lower edges of the gate on opposite sides. The guide rolls move within vertical guide channels defined between the parallel flanges of pairs of vertical angles 34 (FIG. 2) attached to the inside surface of a pair of opposite side walls 36 of a large rectangular cross sectioned vertical discharge housing 38. The discharge housing or enclosure is open at its upper and lower ends for easy access to the gate 22 and unobstructed discharge of material passing out through the discharge opening 22 and discharge chute. The housing includes an outer front wall 40 and is supported from the discharge end of the mixing chamber 14 by suitable side frame structural members 42.

Figure 2:
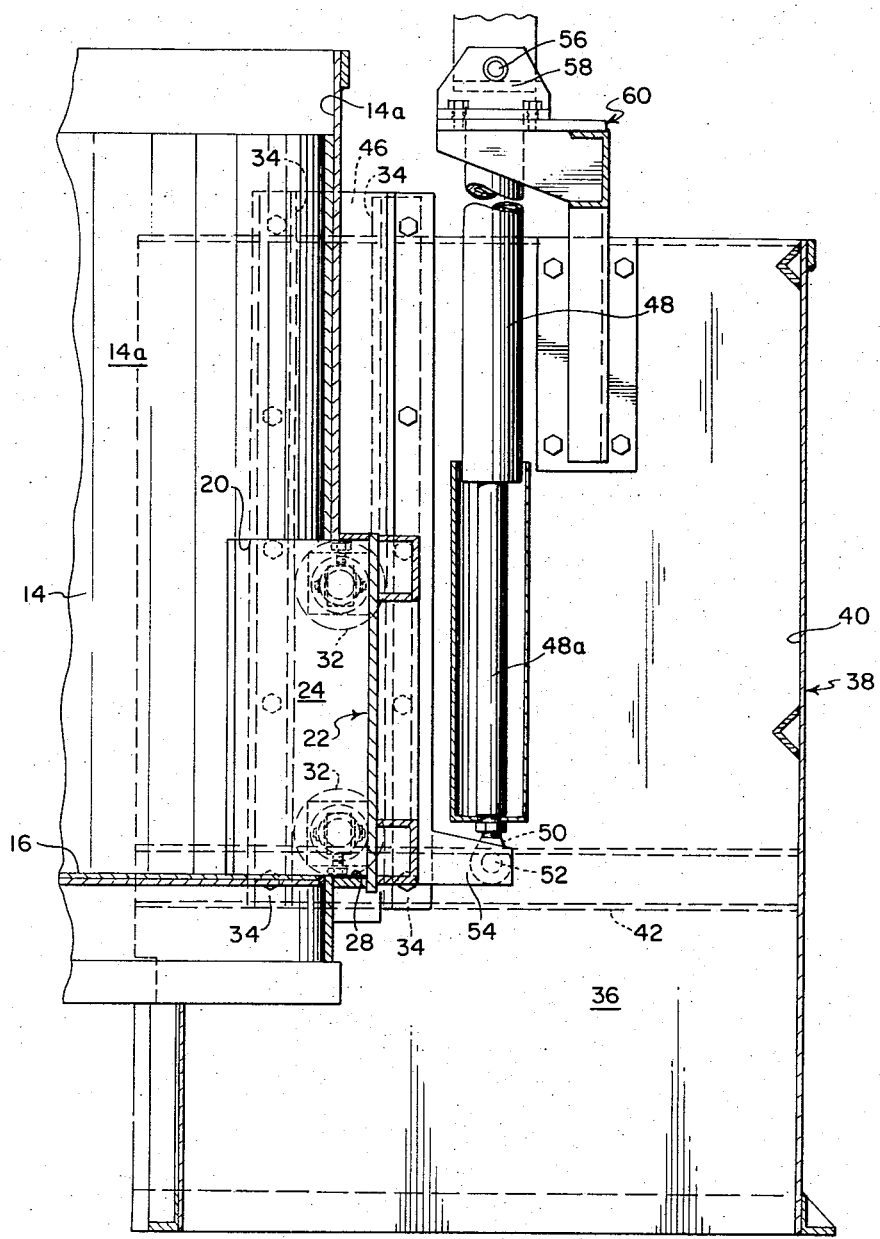
FIG. 2 is a fragmentary sectional view taken substantially along lines 2—2 of FIG. 1, illustrating the discharge gate in a fully closed position.

Transverse shifting of the gate 22 during vertical travel is limited by pairs of smaller secondary rollers 44 which roll against plates 46 attached to the inside surface of the sidewall 36 and which plates serve as a support base for the guide angles 34. The movement of the gate 22 is controlled by a vertically positioned hydraulic cylinder 48 having a piston rod 48a with a clevice 50 attached to the outer end thereof and pivotally interconnected to the lower portion of the gate via a pin 52 and bracket 54 (FIG. 2). The upper end of the cylinder 48 is pivotally supported by a pair of pins 56 supported on angle brackets 58. The brackets are mounted on a support structure 60 carried by the side walls 36 of the discharge housing 38. When pressurized fluid is supplied to the upper end of the cylinder, the gate 22 is moved downward toward a more closed position, and when fluid is supplied to the opposite or rod end of the cylinder, the gate is moved upward toward a more open position. Normally, the gate remains in a selected fixed partially open position to effect the discharge of material at a selected rate. If the rate tends to increase the gate is moved toward the closed position and if the rate tends to decrease, the gate moves toward a more open position.

The mixer 10 is of the general type illustrated and described in U.S. Pat. No. Re. 25,475, dated Nov. 5, 1963, and is normally a component used in a continuous flow type of material processing system. In a continuous flow system, new material is supplied at variably controlled rates to the chamber section 12 via the input conveyor 18 by controlling the drive motor 18a. The input chamber 12 is provided with a rotary mixing head assembly 68 which includes a centrally located, upstanding drive shaft or axle 70. The drive shaft 70 projects downwardly through an opening in the bottom wall 16 for driving connection underneath the mixing chamber 11 with a power system to be described hereinafter. A similar mixing head 72 is mounted in the output chamber section 14 and this mixing head likewise includes a centrally located, upstanding drive shaft or axle 74 which projects through the bottom wall for driving connection with the power system. The mixing heads 68 and 72 are driven to rotate in opposite directions, as indicated by the arrows, and each includes a pair of mulling wheels 74, an inner plow 76 and outer plow 78 for pulverizing and mixing the material contained in the mixing chamber 11. As described in the aforementioned U.S. patent, the outer plows 78 of the mixing heads traverse a common path or area adjacent the center of the chamber 11 at junction of the side-walls 12a and 14a of the mixing chamber sections and, accordingly, material is transferred back and forth between the sections as the mixing heads rotate. Generally, the material entering the input mixing chamber section 12 is mixed and pulverized by the mixing head 68 and is then transferred into the output chamber section 14 where further mixing and pulverization is accomplished by the mixing head 72 before the finished material is ultimately discharged through the outlet opening 20. To this end, the mixing heads are driven in selected synchronous relation to one another, and this insures that the outer plow of one mixing head does not interfere with the outer plow or mulling wheels of the other when traversing the common area adjacent the junction of the mixing chamber sections 12 and 14. It is also to be understood that the mixing heads employed can be somewhat different from those illustrated in the aforementioned U.S. patent; for example, when mixing dry materials, it is sometimes desirable to eliminate the mulling wheels altogether and substitute plows or scrapers in their stead to be driven by the mixing heads at much higher speeds than when mulling wheels are present. One such high speed mixing head arrangement is shown and described in the copending U.S. Pat. No. 3,456,906 dated July 22, 1969 and it is contemplated that the system of the present invention may effectively utilize a machine of this type.

In order to turn the shafts 70 and 74 of the respective mixing head assemblies 68 and 72, a power driving system indicated generally as 80 is mounted below the mixing chamber floor or bottom wall 16. The power driving system includes a pair of heavy duty speed reducers 82 and 84 which are secured to the underside of the bottom wall 16 and are directly connected to the mixing head drive shafts 70 and 74, respectively. The speed reducers include respective input shafts 82 and 84a, and these input shafts are driven from a common power shaft 86 by a pair of belt drive assemblies 88 and 90. The common drive shaft is directly coupled to an electric motor 92, preferably of the three-phase, alternating current type. The windings of the motor are supplied with alternating current from a three-wire A.C. supply system as indicated in FIG. 3, and when a three-phase A.C. power is connected to the lines and turned on, the motor 92 is energized and begins to rotate, thereby turning the mixing head assemblies 68 and 72 in selected synchronous rotation. The amount of electrical energy or power supplied to the motor 92 through the A.C. power lines is proportional to the amount of and/or viscosity of the material contained in the mixing chamber 11. If a greater than average amount of material is in the mixing chamber or if the material is more viscouse than average, more electrical energy will be required to turn the mixing head assemblies 68 and 72 and, correspondingly, a reduction of the volume of material in the chambers or a reduction in the viscosity thereof will reduce the electrical energy or power supplied to the driving motor 92.

Referring now more particularly to the schematic diagram shown in FIG. 3, from a suitable power source, three-phase AC current is supplied to the mixer drive motor 92 through a plurality of power lines 93, each having circuit protection therein as a fuse or the like and a disconnect switch 94. The amount of current supplied to the motor 92 is sensed by means of a current transformer 95 and the output signal is fed into a meter relay and control module 96 of the type having selectively adjustable low set and high set points, each independently adjustable a desired set point by knobs 97a and 97b. The meter relay includes an indicating pointer 98 coupled to an armature and visually indicates to a viewer the amount of load on the mixer drive motor 92.

AC power for control of the operation of the mixer door 22 is supplied from a low voltage signal phase source through lines 99 having fuses and a shut off switch therein. When the meter relay pointer 98 senses a load above the selected high set point as set by positioning the high set knob 97b, a circuit is established energizing a door opening relay 100. Similarly, when the load on the motor 92 as sensed by the meter relay control module 96 is below a selected low set point as set up by the knob 97a, a door closing relay 102 is energized. The range of variation between the low set point and high set point is adjustable as desired to provide a selected variation or range above and below a normal or neutral setting. The range or variation between neutral and the high set point may be greater or smaller than the range between neutral and the low set point, and these ranges are independent of one another and may be changed from time to time to different values. The door opening relay 100 controls two pairs of normally open contacts 100-1 and 100-2 and two pairs of normally closed contacts 100-3 and 100-4 and similarly, the door closing relay 102 controls two pairs of normally open relay contacts 102-1 and 102-2 and two pairs of normally closed contacts 102-3 and 102-4. The primary hydraulic cylinder 48 which moves the door 22 is hydraulically coupled via a pair of hydraulic lines 104 and 106 to a secondary hydraulic cylinder 108 of identical size. The hydraulic coupling lines are provided with shutoff or locking valves 110 and 112, both of which are electrically operated by a hydraulic control or locking solenoid 114. When the solenoid is not energized the valves are biased to a closed or "lock" position as shown blocking off flow between the two hydraulic cylinders. In this condition, the noncompressible hydraulic fluid on opposite sides of each piston, locks the piston against movement and thus holds the door 22 in whatever position it was in when the solenoid 114 is de-energized. The secondary hydraulic cylinder 108 is coupled via a piston rod 108a with the piston in a pneumatic control cylinder 116. Compressed air for operation of the pneumatic cylinder is supplied from a suitable source thereof via a door opening control valve 118 actuated by a door opening solenoid coil 120 or via a door closing valve 122 actuated by a door closing solenoid coil 124. The valves 118 and 122 are shown diagramatically in the normal position with the respective solenoid coils in a de-energized condition similar to the hydraulic lock valves 110 and 112 which are shown diagramatically in the normal position with the hydraulic lock solenoid 114 de-energized. Compressed air is supplied and/or exhausted from the upper end of the pneumatic cylinder 116 via an upper line 126 connected to the valve 118 and similarly a line 128 is provided between the lower end of the air cylinder and the door closing valve 122.

In order to move the door 22, the lock solenoid 114 is energized, the hydraulic-lock valves 110 and 112 are opened to permit fluid flow between the primary and secondary hydraulic cylinders 48 and 108 through the lines 104 and 106. The air cylinder 116 is then activated to move the piston of the secondary hydraulic cylinder 108, which action moves the piston in the primary hydraulic cylinder 48 to raise or lower the mixer door 22. The pistons in the hydraulic cylinders move in opposite directions and when no further movement is required, the hydraulic lock solenoid 114 is de-energized and the lock valves 110 and 112 go to the normally closed or lock position as shown to hold the door in its present position and prevent any further movement thereof. When the door 22 is stationary in a neutral position with the door opening solenoid 120, the door closing solenoid 124 and the hydraulic lock solenoid are de-energized and the valves 118 and 122 are in the position shown exhausting both the upper and lower ends of the pneumatic cylinder 116. If the hydraulic lock solenoid 114 is energized and one or the other of the valves 118 or 122 is activated by energizing its controlling solenoid winding, the valve moves to supply compressed air to the selected end of the air cylinder causing the piston to move toward the opposite end. For example, if the door opening solenoid valve 118 is activated by energizing the solenoid winding 122, pressurized air is supplied to the upper end of the pneumatic cylinder 116 causing the piston to be driven downwardly and thus moving the directly coupled piston in the secondary hydraulic cylinder 108 downwardly. As this occurs, the piston in the primary hydraulic cylinder 48 is moved upwardly causing the door to move upwardly toward a more open position. Similarly, if instead the door closing valve 122 is activated by energizing the door closing solenoid 124, pressurized air is admitted to the lower end of the air cylinder 116 causing the piston to move upwardly and move the piston of the secondary hydraulic cylinder 108 upwardly. As this occurs the piston in primary hydraulic cylinder 140 moves downwardly causing the door to move toward a more closed position. The system is described and known as an air-over-hydraulic actuator system and provides a novel way of positively fixing or locking and maintaining the door 22 in a selected neutral position and yet permitting movement towards a more open or a more closed position in response to a selected high or low load signal as provided by the meter relay and control module 96. This system eliminates continuous hunting movement of the door and accordingly reduces wear, and prolongs life for the associated mechanical parts and electronic components.

The amount of variation or range in load above or below a desired mean is adjustable and is easily set by the knobs 97a and 97b. A wide range or variation above or below a desired mean may be set up and a smaller range of variation may also be provided when required for a particular application. The respective high and low variation above a selected neutral value do not have to be equal and the amount of variation before a low set point is encountered may be different from the amount of variation before a high set point is encountered.

In order to control and provide for selective adjustment of the mean or neutral position and thus set up the normal, partially open position of the door 22 with respect to the opening 20 in chamber wall 14 a pair of vertically spaced cams 130 and 132 are adjustably mounted on the door for movement therewith to activate a pair of normally open upper and lower limit switches 134 and 136. The limit switches are mounted in vertically spaced relation on an upstanding mounting bracket 138 and the position and spacing of the limit switches on the mounting bracket 138 may be adjusted to regulate the mean or neutral position of the door and hence the normal flow rate of discharge. The bracket may be adjusted in relation to the mixer floor 16 as desired to provide a convenient way of raising or lowering the fixed neutral position of the door 22 with respect to the opening 20 in the mixing chamber side wall 14.

When the primary hydraulic cylinder 48 is activated to move the door 22 out of the neutral position upwardly toward a more open position, the cam 130 engages the operator of the limit switch 134 causing the switch contacts to close and the switch contacts remain closed as long as the door 22 is above the selected neutral position. Similarly when the cylinder 48 is activated to move the door downwardly of the neutral position towards the more closed position, the cam 132 engages the operator of the limit switch 136 and causes its contacts to close and remain closed as long as the door is below the selected neutral position. With the door in the selected neutral position as indicated neither of the limit switches 134 or 136 is activated and the contacts thereof remain normally open until such time as door movement occurs or adjustment of the rest or neutral position is made.

The normally open contacts 100-1 and 100-2 are wired in parallel with one another and in series with the hydraulic lock solenoid 114. Accordingly if either of the contacts 100-1 or 102-1 is closed by virtue of the fact that the controlling relay 100 or 102 is energized, the hydraulic lock solenoid 114 is thus energized to unlock the hydraulic lock valves 110 and 112 and permit movement of the piston in the primary hydraulic cylinder 48. Assume that the high and low set points have been selected as desired by adjustment of the knobs 97a and 97b on the meter relay 96 and that the desired neutral position of the door 22 has been selected by vertical adjustment of the support bracket 138 for the limit switches 134 and 136 relative to the 130 and 132, if the load on the mixer motor 92 as sensed by the meter relay 96 increases to a value above the high set point, the door opening relay 100 is energizing causing its contacts 100-1 and 100-2 to close the contacts 100-3 and 100-4 to open. With the contacts 100-1 closed, electrical power is supplied to energize the hydraulic lock solenoid 114 thereby unlocking the hydraulic lock valves 110 and 112. With the contacts 100-2 closed, the door opening solenoid 120 is energized and this causes the door opening valve 118 to supply pressurized air to the upper end of the pneumatic cylinder 116 via the supply line 126. The piston in the air cylinder moves downwardly causing the piston in the secondary hydraulic cylinder 108 to do likewise and as this occurs, fluid from the lower end of the secondary hydraulic cylinder is pumped via the line 106 and open valve 112 into the lower end of the primary hydraulic cylinder 48. The door 22 is moved upwardly out of the neutral position towards a more open position and this causes the flow rate of discharge of material from the mixer to increase and reduce the load on the mixer motor 92. As the material flows out of the mixer at an increased rate the load on the mixer tends to decrease and eventually the pointer 98 of the meter relay moves below the high set point, which action de-energizes the door opening relay 102 and returns the contacts controlled thereby to their normal position. However, because the door 22 has moved upwardly out of the neutral position, the normally open contacts of the limit switch 134 are retained in the closed position by engagement with the cam 130. Current is thus still supplied to energize the hydraulic lock solenoid 114 via the closed contacts of the limit switch 134 and the normally closed contacts 100-4. Current is also supplied to the door closing solenoid 124 via the closed contacts 100-3 so that the door closing valve 122 is activated and admits pressurized air to the lower end of the pneumatic cylinder 116. As this occurs the pneumatic piston moves upwardly causing the piston in the secondary hydraulic cylinder 108 to do likewise. Hydraulic fluid is pumped via the line 104 and the open lock valve 110 into the upper end of the primary hydraulic cylinder 48 causing the piston and door 22 to move downwardly or return toward the neutral position. When the neutral position is reached the cam 130 moves out of engagement with the operator of the limit switch 134 and the contacts return to their normally open position de-energizing the solenoids 114 and 124. This action returns the hydraulic locking valves 110 and 112 to the closed lock position as shown and retains the hydraulic liquid lock on both sides of the pistons in the hydraulic cylinders 48 and 108 to maintain the door 22 in a neutral position until further underload or overload conditions are sensed by the meter relay and control module 96.

Should the meter relay and control module 96 sense a low load position as indicated by movement of the pointer 98 below the low set point, the door closing relay 102 becomes energized causing the normally open contacts 102-1 and 102-2 to close. When this occurs the hydraulic lock solenoid 114 is energized to open the hydraulic lock valves 110 and 112 and the door closing solenoid 124 is energized through the now closed contacts 102-2. This activates the door closing valve 122 to supply pressurized air via the line 122 to the lower end of the air cylinder 116 driving the piston in the secondary hydraulic cylinder 108 upwardly. The piston in the primary cylinder 48 is driven downwardly causing the door 22 to move towards a more closed position. When the door 22 is in a position below the neutral, the discharge rate is reduced and the amount of material begins to build up in the mixing chamber 11. An increase in load on the motor 92 results and as the increased load is sensed by the current transformer 95 the meter relay 96 reacts and the points 98 move above the low set point. When this occurs the door closing relay 102 is de-energized and the normally open contacts 102-1 and 102-2 return to their normal positions. The normally closed contacts 102-3 and 102-4 return to the closed position. The door 22 is below the neutral position and the cam 132 maintains the contacts of the limit switch 136 in a closed position to supply current therethrough to the door opening solenoid 120 and the hydraulic solenoid valve control winding 114 via the contacts 102-4. As this occurs the door opening solenoid 120 activates the valve 118 supplying pressurized air via the line 126 to the upper end of the pneumatic cylinder 116 and as described the door 22 moves upwardly toward the neutral position until the cam 132 moves out of contact with the limit switch 136 which then returns to a normally open position. The door 22 is thus maintained in a fixed neutral position and is held in this position until such time as the meter relay control module 96 senses a selected over or underload condition as set up by the selectively adjustable position of the low and high set points controlled by the knobs 97a and 97b.

It has been found that a vertically modulated door provides more precise flow control than an angularly modulated door as in the prior art. Moreover, with a vertically modulated door the neutral position for more precise control is fixed until such time as a variation in load exceeds a prescribed limit above or below. With this arrangement less wear and tear on working parts are required in comparison to a continuously modulated arrangement. In addition, the tolerance range of the door in the neutral position can be readily controlled and adjusted as needed by increasing or decreasing the spacing between the cams or limit switches. Thus, after each modulation in response to a high or low load variation, return of the door to a more precise neutral position is readily achieved. The positive locking and maintaining of the door 22 in a selected neutral position achieved by the air over hydraulic system provides reliable and positive control of the door.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A mixer for conditioning bulk material comprising in combination; a mixing chamber and motor means driving a rotary mixing element in said chamber; and a controllable discharge system for discharging material from said chamber at a selected rate, said discharge system comprising an outlet opening formed in said mixing chamber, a discharge door adjacent said opening mounted for reciprocal vertical movement between a closed position covering said opening and an open position uncovering said opening, and means for normally maintaining said door in a fixed neutral position partially uncovering said opening and operable to move the door out of said neutral position when a selected variation in load on said motor means is exceeded and to return said door to said neutral position when said variation is no longer exceeded, said maintaining means including a fluid motor connected to said door and means for entrapping noncompressible liquid in said motor to retain said door in said neutral position, said entrapping means including liquid valve means operable to release entrapped liquid whenever said selected variation in load is exceeded.

2. The mixer of claim 1 wherein said maintaining means includes a secondary fluid motor interconnected in parallel with said first mentioned fluid motor through a pair of interconnecting conduits, said entrapping means comprising valves in said conduits for opening and closing the same to release and entrap liquid between said fluid motors.

3. The mixer of claim 2 including a compressible fluid motor mechanically linked with said secondary fluid motor to operate the same to pump liquid between said secondary and said first mentioned fluid motor to move said door.

4. The mixer of claim 1 including return means for sensing the position of said door for returning said door toward said neutral position whenever said door is not moving away from said neutral position and said variation in load is no longer exceeded.

5. The system of claim 1 including means for adjusting said neutral position to control the normal flow rate of material through said outlet opening.

* * * * *